United States Patent [19]
Krummell et al.

[11] Patent Number: 5,312,004
[45] Date of Patent: May 17, 1994

[54] PUSH-BACK RETROFIT SYSTEM FOR A STORAGE RACK ASSEMBLY

[75] Inventors: John V. R. Krummell, 591-102 John K Dr., Long Beach, Calif. 90803; Kenneth E. Davison, Hermosa Beach, Calif.

[73] Assignee: John V. R. Krummell, Long Beach, Calif.

[21] Appl. No.: 876,658

[22] Filed: Apr. 30, 1992

[51] Int. Cl.⁵ ............................................. A47F 5/00
[52] U.S. Cl. .................................. 211/151; 211/59.2; 414/276
[58] Field of Search .............. 211/59.2, 151; 414/276, 414/286

[56] References Cited

U.S. PATENT DOCUMENTS

| | | | |
|---|---|---|---|
| 4,613,270 | 9/1986 | Konstant | 211/151 X |
| 4,687,404 | 8/1987 | Seiz et al. | 211/151 X |
| 4,773,546 | 9/1988 | Konstant | 211/151 |
| 5,137,159 | 8/1992 | Collins et al. | 211/151 |
| 5,170,896 | 12/1992 | Konstant | 211/151 |
| 5,203,464 | 4/1993 | Allen | 211/151 |

*Primary Examiner*—Robert W. Gibson, Jr.
*Attorney, Agent, or Firm*—Lyon & Lyon

[57] ABSTRACT

An apparatus and a method for retrofitting a storage rack assembly with a push-back system. Rail structures on which a push-back cart will travel are attached to an existing storage rack assembly with no or slight modification of the existing storage rack assembly. The push-back storage system may be retrofitted to a variety of different prior art storage racks; for example, a selective rack assembly or drive-in rack assembly.

12 Claims, 6 Drawing Sheets

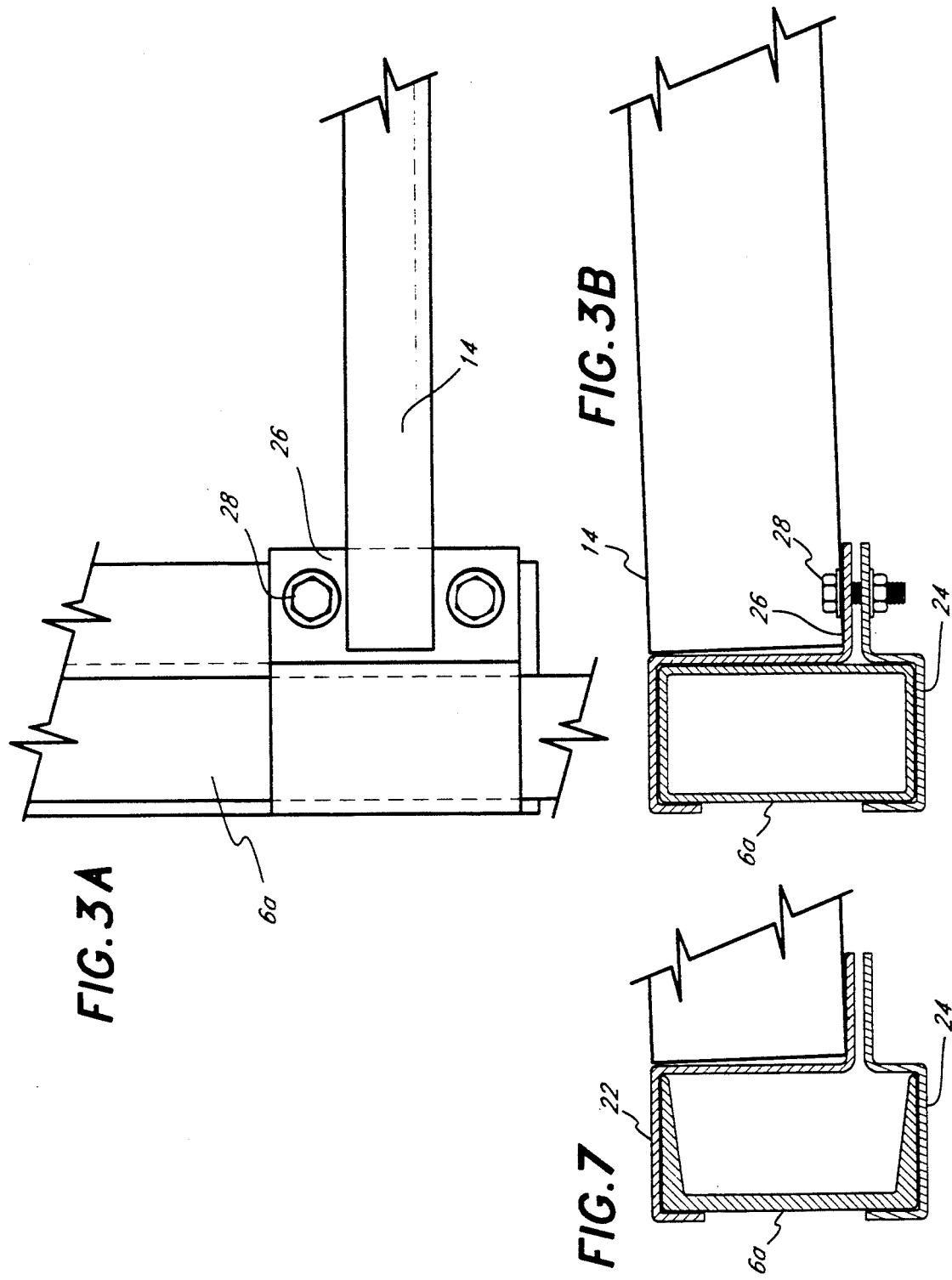

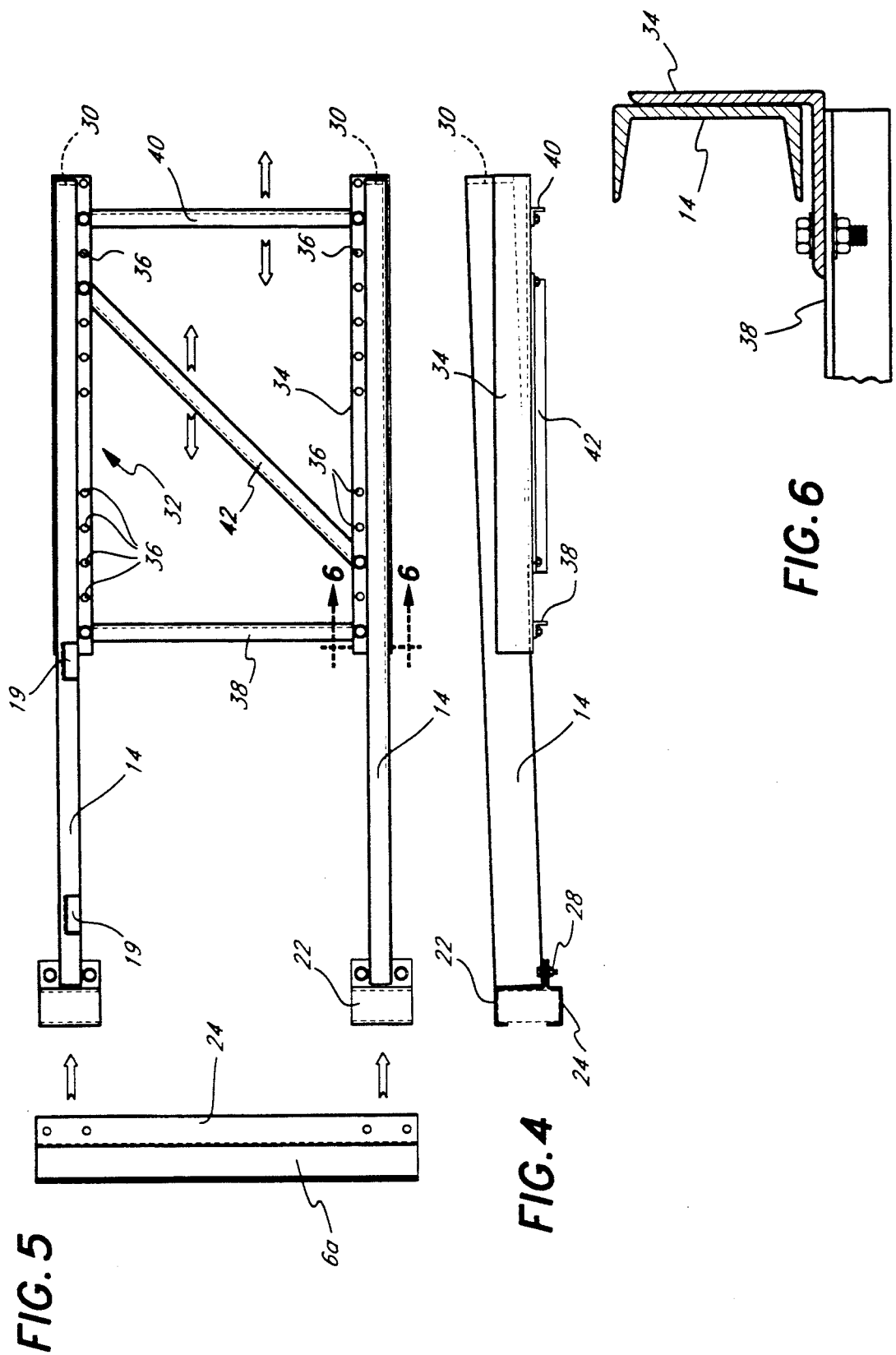

PUSH-BACK RETROFIT SYSTEM FOR A STORAGE RACK ASSEMBLY

BACKGROUND OF THE INVENTION

The present invention relates in general to an apparatus and method for retrofitting storage rack assemblies with push-back systems. More specifically, the present invention comprises a set of rails, supported by a frame structure that not only serves to incline the rails but also keeps the rails at a predetermined distance from each other so that a push-back cart may translate along the rails. The configuration of the rails and frame allows them to be assembled or dropped into place on an existing rack assembly without requiring structural modification of the rack assembly.

Many companies and individuals find it desirable or necessary to have some form of storage rack assemblies to facilitate high density storage. These racks allow one to organize products for quick access while maximizing the effective use of available space. Presently, there are several different styles of storage racks, including selective rack assemblies and drive-in rack assemblies.

In one form of a selective rack assembly, a sturdy, weight-bearing structure is formed from various vertical, horizontal, and diagonal steel members, which are connected to create several stacked horizontal surfaces or shelves. Items, which are typically on pallets, are then placed on the racks. Since the shelves are capable of supporting a great deal of weight, the pallets of material often are placed on the racks with forklifts.

In a conventional drive-in rack, the pallets (on which the items to be stored are placed) directly provide much of the load support, contrary to what occurs with the selective racks. In the selective racks, the loaded pallets are slid onto horizontal support members, which pass underneath and support each pallet along multiple directions. On the other hand, in a conventional drive-in rack, the pallets are typically supported by the storage rack assembly along only two parallel sides of each pallet. Since conventional drive-in racks only have two parallel, horizontal weight-bearing support rails per lane, a forklift operator may drive into a lane between parallel support members to remove a pallet.

A drawback of the conventional drive-in rack is that, before the second load of an upper level may be accessed, all of the loads in front of the desired load that are at or below the level on which the desired load rests must first be removed. Thus, unless considerable rehandling is acceptable, a drive-in bay provides effective storage for just one type of item. Further, the forklift time required to place loads in and remove loads from drive-in racks is considerable, since the support rails are so close together that the forklift operator must move very slowly to preclude hitting the racks and damaging the racks or the merchandise.

The idea of retrofitting push-back lanes in drive-in racks has been used in the prior art. However, the prior art retrofitting systems require substantial modification of the existing rack assembly. In the prior art, the existing drive-in rails and supports are removed and replaced with new load beams so that a conventional push-back system may be installed.

It is an overall object of the present invention to provide push-back systems that may be rapidly and inexpensively retrofitted into existing storage racks with minimal modification of the existing storage racks. Push-back systems provide greater selectivity and increase the speed of put-away and retrieval operations. Using a push-back system, each lane of a storage rack may contain a unique item, and yet each item may be easily accessed without rehandling items in other lanes to get to the desired item.

It is another object of the present invention to provide a self-contained push-back module, which may be assembled on the ground and then lifted into position with a forklift, resulting in significant installation labor savings.

It is a further object of the present invention to build the rail pitch, which results in gravitational force acting on the push-back cart, into the push-back modules instead of the load beams. This allows the current invention to be attached to almost any existing storage rack.

It is yet another object of the present invention to standardize the push-back modules so that little custom engineering is required, and the modules can be sold as a catalog item. Unlike the invention disclosed herein, prior art systems require extensive custom engineering for each retrofit.

SUMMARY OF THE INVENTION

In accordance with the objects of this invention, the retrofit push-back systems of the present invention may be installed on existing storage racks with minimal modification or alteration of the existing storage racks. The cost of and time required for retrofitting storage racks with the push-back systems of this invention are thereby reduced.

In the illustrative embodiments of this invention, described hereinafter, the push-back systems are installed on two types of storage racks. Each embodiment shares some general characteristics. First, each embodiment provides rails upon which push-back carts translate. Second, the rail pitch is integrally built into the embodiments. Therefore, the storage racks that are to receive the push-back systems do not have to be modified to provide an incline for the rails. Third, the distance between the rails is maintained by structural members that form an integral part of the retrofit module, which again eliminates the need to make costly modifications to the existing rack assemblies themselves.

The foregoing and other objects and features of this invention will be more fully understood from the following description of two preferred embodiments in conjunction with the accompanying drawings.

BRIEF DESCRIPTION OF THE DRAWINGS

FIG. 3A is a side view of a portion of the FIG. 2 retrofit push-back system, showing the front load beam clamping mechanism;

FIG. 3B is a cross-sectional top view showing the manner in which the front load beam clamping mechanism of FIG. 3A is secured to a box-type load beam;

FIG. 4 is a side view of the retrofit push-back system of FIG. 2;

FIG. 5 is a top view of the retrofit push-back system of FIG. 2;

FIG. 6 is a cross-sectional view taken along line A—A of FIG. 5;

FIG. 7 is a cross-sectional view of the front load beam clamping mechanism from FIG. 3A, secured to a channel-type load beam;

BEST MODE FOR CARRYING OUT THE INVENTION

The push-back systems of the present invention can be retrofitted to a variety of different prior art storage racks. In prefabricated form, these push-back systems can be mounted in place in an already existing rack assembly, thereby converting that rack assembly to push-back usage without further modification of the rack assembly. Substantial savings in the speed, ease and cost of conversion to push-back can thus be achieved.

Figure 1:
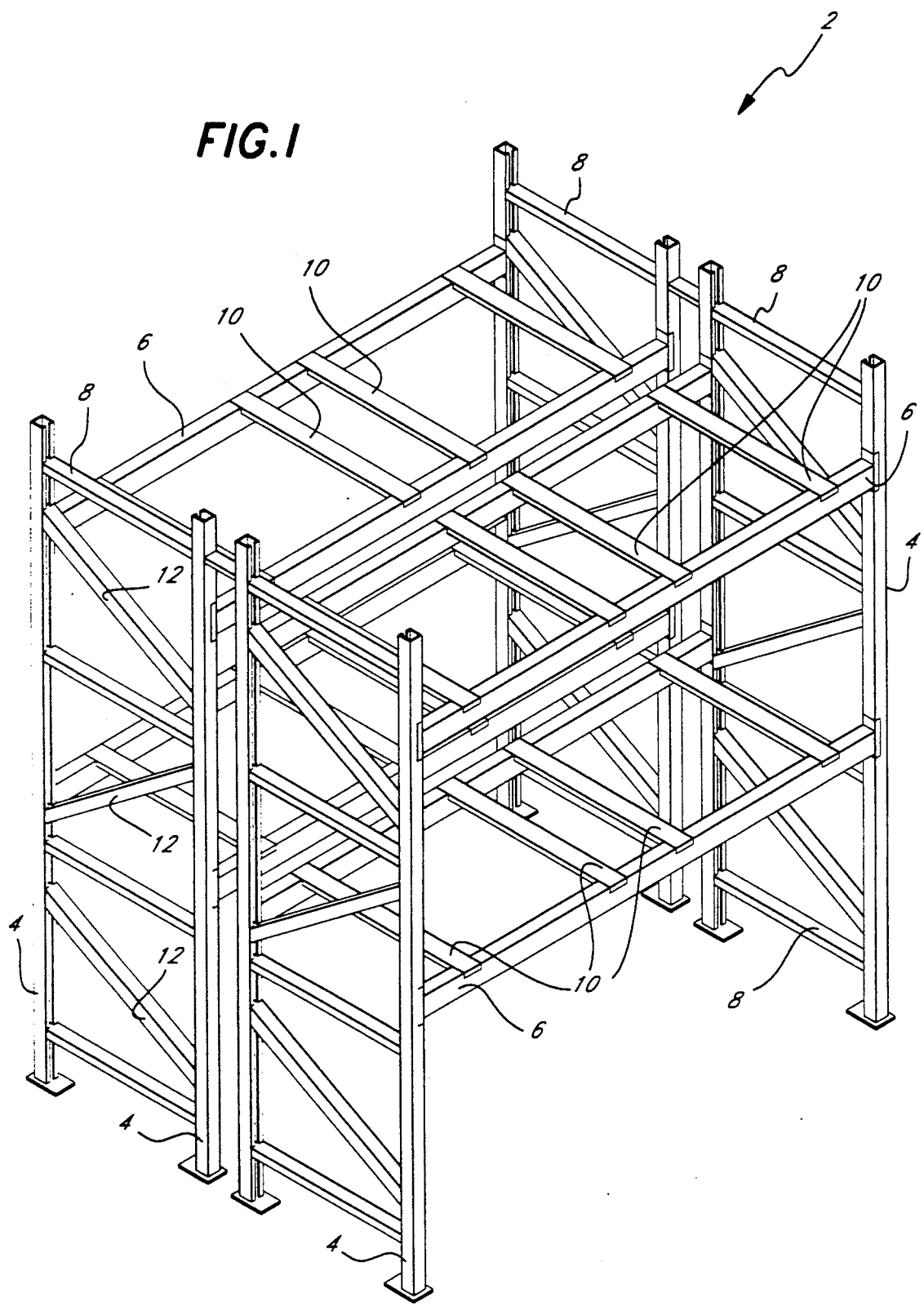
FIG. 1 is an isometric drawing of a prior art storage rack assembly.

One type of prior art rack assembly, known as a selective rack assembly, can be seen in FIG. 1. Although a two-pallet deep assembly is shown in FIG. 1, the principles of the present invention can be applied to assemblies which are three, four or more pallets deep. Selective rack assembly 2 is fabricated using a series of upright posts 4 rigidly joined together by load beams 6. The upright posts 4 may consist of channel stock or other suitable structural members. The load beams 6, which may be two, three, four or more in number depending upon the depth of the rack consist of conventional structural members such as channel, box-type, tube or angle members suitably fastened, e.g., by welding or bolted support plates, to the upright posts 4. A series of horizontal cross-bars 8, consisting of roll-formed channel or other suitable material, are also fastened to the upright posts 4. The dimensions of the horizontal cross-bars 8 are chosen so as to separate the upright posts 4 by an amount sufficient to accommodate storage pallets within the confines of the rack assembly 2. An optional series of structural slats 10 bridge the distance between adjacent load beams 6 to provide an additional means for supporting the pallets. Diagonal cross-bars 12 may, if desired, be connected between upright posts 4 to increase the rigidity of the rack assembly 2.

Figure 2:
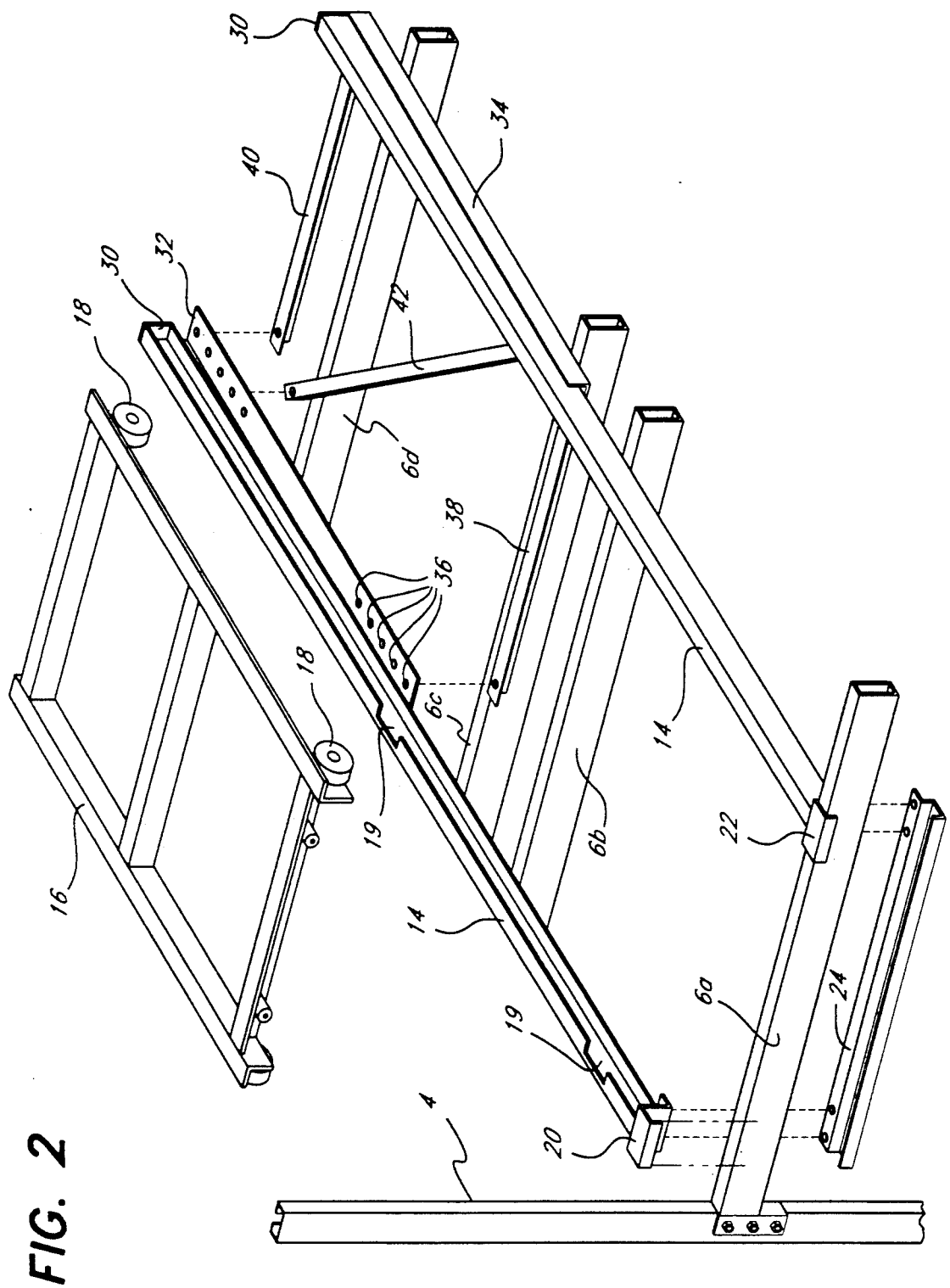
FIG. 2 illustrates a first embodiment of the present invention, wherein the storage rack assembly of FIG. 1 is retrofitted push-back system.

FIG. 2 illustrates a first embodiment of a retrofit push-back system constructed in accordance with the present invention. As seen in FIG. 2, a pair of rails 14 are retroactively installed on rack assembly 2 to furnish a guide track for one or more conventional push-back carts 16. Rails 14 comprise channel stock or other structural material having a cross-section suitable for confining and guiding the rollers 18 of push-back cart 16. Slots 19 may be cut into the railhead of one of the rails to receive rollers 18, permitting cart 16 to be inserted into the guide track after the rails are installed. A pair of suitably configured clamping plates 20, 22, which are secured to the front end of rails 14, clip over front load beam 6a and are held in place via a J-strut 24 or some other suitable attachment means known to those skilled in the art.

As is illustrated to best advantage in FIGS. 3A and 3B, each clamping plate 20, 22 is formed with a flange 26 to which the associated rail 14 is fastened, e.g., by welding or bolting. The clamping plates 20, 22 are clipped over front load beam 6a and tightened against J-strut 24, e.g., by bolts 28. The bottom surface of rails 14 can then rest on rear load beams 6b, 6c and 6d. Where the rear load beams are releasably attached to the upright posts 4, the heights of the rear load beams are individually adjusted to create a slight incline of the rails relative to the horizontal. If the rear load beams are fixedly secured to the upright posts and cannot be adjusted, those of ordinary skill in the art will understand that a series of variable height channel spacers (not shown) can be attached to the rear load beams to establish the proper pitch for the rails.

The slight incline of rails 14, viewed to best advantage in FIG. 4, causes push-back cart 16 to roll forward to the front load beam 6a, where the cart can receive a pallet for storage. A second pallet is thereafter urged against the first pallet, forcing push-back cart 16 to roll rearward along rails 14 until adequate space has been cleared to deposit the front pallet directly on the upper surfaces of the rails. End plates 30 welded, bolted or otherwise secured to rails 14 seal off the rear of the rails to prevent push-cart 16 from falling out of the guide track when the cart 16 reaches its rear-most position on the rails. In this manner, two-deep, three-deep, four-deep or greater pallet storage capability associated with a conventional push-back system is achieved through the use of the inventive retrofit push-back system of the present invention.

Returning to FIG. 2, a pair of structural members 32, 34 which may be L-shaped in cross-section are secured, e.g., again by welding or bolting, to the rearward portions of rails 14. A series of holes 36 is bored through the base of each member 32, 34. These holes are used to attach forward and rearward struts 38, 40 to each of the rails 14 using nuts and bolts. Struts 38 and 40 serve to rigidly space the rails 14 from each other at a distance which is determined by the width of push-cart 16. The forward and rearward struts 38, 40 may be adjusted in a forward or rearward direction to avoid interference between the struts 38, 40 and the rear load beams 6b, 6c, and 6d, enabling the rails 14 to be installed with storage rack assemblies of varying depths. If desired, a diagonal strut 42 may also be connected between members 32 and 34 to align and increase the strength of the retrofit push-back system.

FIG. 5 is a top view of the retrofit push-back system 2, illustrating the relationship between rails 14, members 32, 34, forward and rearward struts 38 and 40 and diagonal strut 42. FIG. 6 is cross-sectional view along line A—A of FIG. 5 showing the structural details of member 34 and the manner of attaching forward strut 38 to member 34. Although member 34 is depicted with an L-shaped cross-section in FIG. 6, any suitable cross-section will suffice.

FIG. 7 shows the use of clamping plate 22 and J-strut 24 with a front load beam 6a formed from channel stock, as opposed to the box beam construction of the front load beam 6a in FIGS. 1-4.

Figure 8:
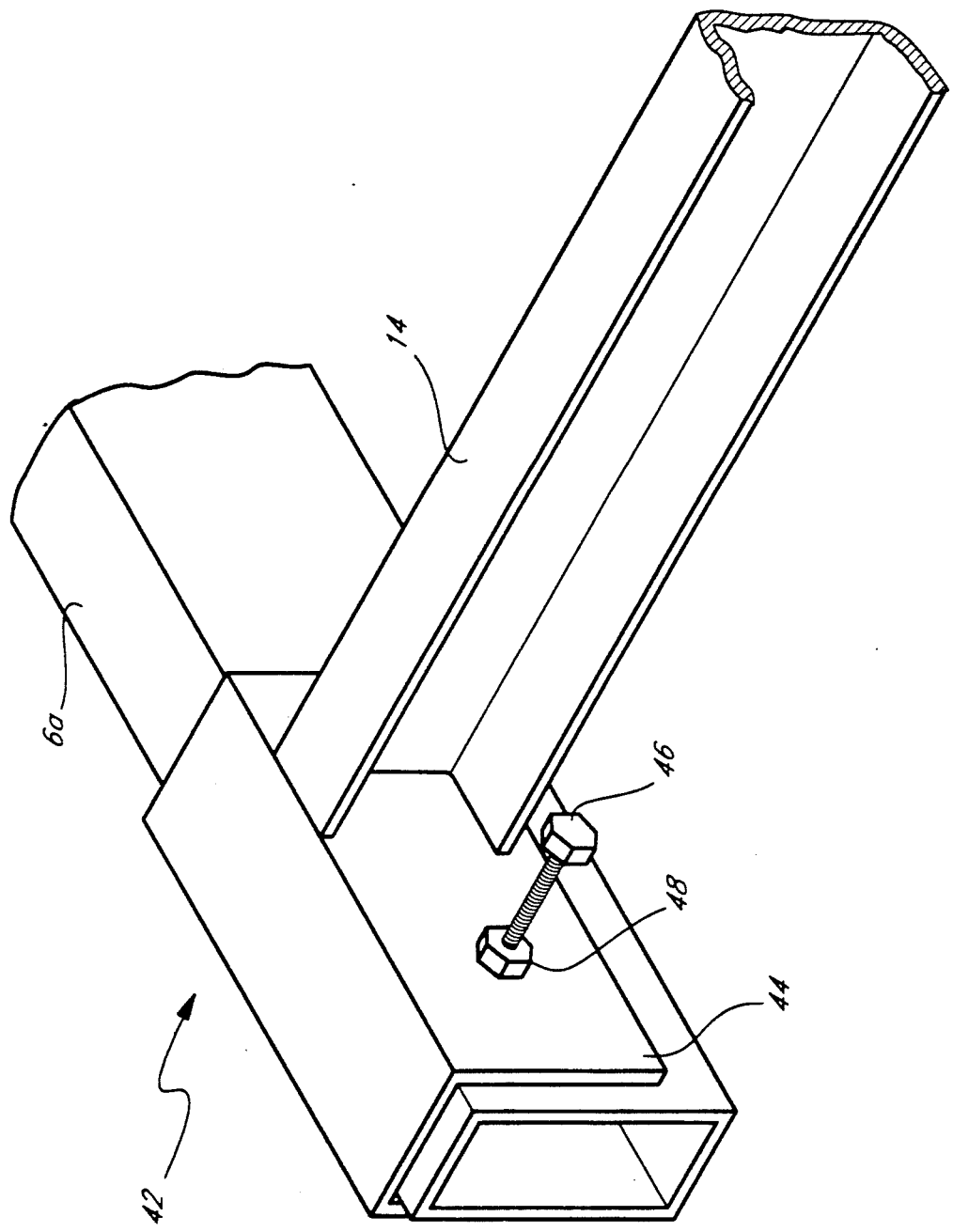
FIG. 8 is an isometric view of an alternative front load beam clamping mechanism designed for use with box, channel or step type load beams.

An alternative clamping mechanism 42 for securing rails 14 to a box-type front load beam 6a is shown in FIG. 8. The clamping mechanism 42 comprises a U-shaped member 44 which is welded or otherwise fixed to the front end of rails 14. Member 44 is simply clipped over the top of front load beam 6a. A clamping bolt 46 which passes through a nut 48 welded to one face of member 44 is then tightened to secure clamping mechanism 42 and rail 14 to the front load beam 6a. Other configurations for a clamping mechanism, known to those skilled in the art, may also be employed.

Figure 9:
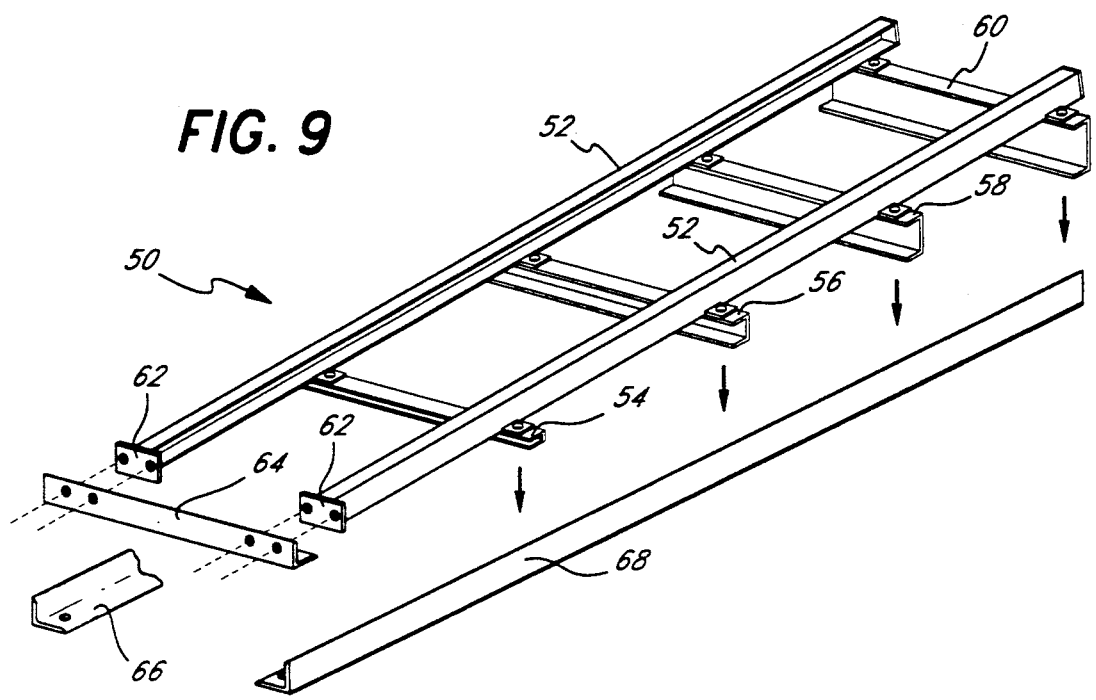
FIG. 9 isometrically illustrates a second embodiment of a retrofit push-back system constructed in accordance with the present invention, which second embodiment is designed for use with drive-in storage bay assemblies.
Figure 10:
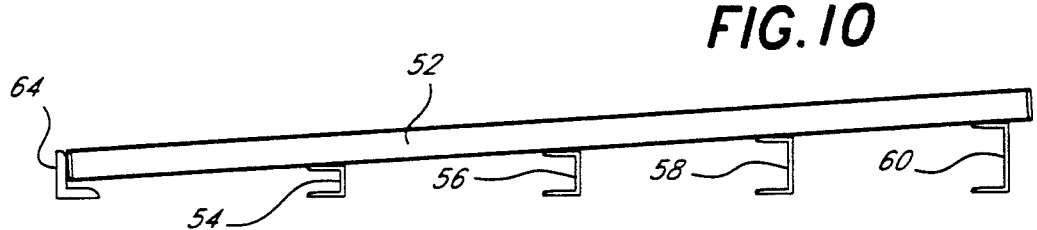
FIG. 10 is a side view of the retrofit push-back system from FIG. 9.

A second embodiment of the present invention, designed to provide retrofit push-back capability for conventional drive-in rack assemblies, is disclosed in FIGS. 9-11. As seen to best advantage in FIG. 9, the alternate retrofit push-back system 50 is constructed from a pair of rails 52 which are secured to a series of channel members 54, 56, 58, and 60 of graduated size. Plates 62 welded to the front of rails 52 are bolted onto a front angle bar 64. Rails 52 are spaced from one another by front angle bar 64 and channel members 54, 56, 58, 60 at a distance sufficient to accommodate one or more conventional push-back carts (not shown in FIG. 9). The entire retrofit push-back assembly 50 is dropped into the drive-in angles (sometimes called "rails") 66, 68 normally used to hold pallets in a conventional drive-in rack assembly. Front angle bar 64 and rear channel 60 are provided with holes for bolting retrofit push-back system 50 onto the drive-in angles. The only requirement for preparing a conventional drive-in rack assembly to receive the retrofit push-back system 50 is the drilling of bolt holes in drive-in angles 66, 68 to match the bolt holes in front angle bar 64 and rear channel 60.

FIG. 10 is a side view of a retrofit push-back system 50, illustrating the manner in which rails 52 are inclined to effect proper push-back operation.

Figure 11B:
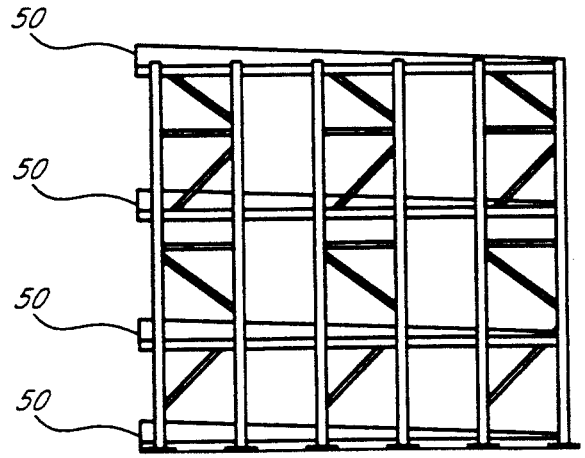
FIG. 11B is a side view of a prior art drive-in storage bay assembly which has been retrofitted with the push-back system of the present invention.
Figure 11A:
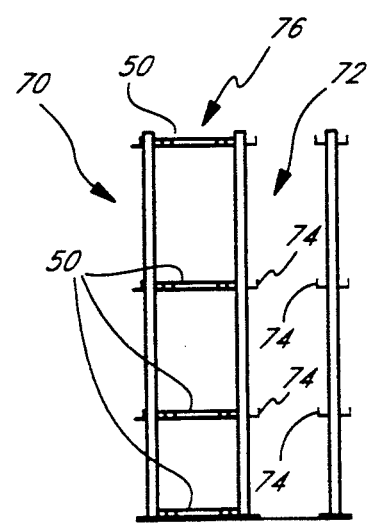
FIG. 11A is a front view of a prior art drive-in storage bay assembly showing one of the bay sections in its original form and another of the bay sections retrofitted with a push-back system.

FIG. 11A is a front view of a conventional drive-in rack assembly 70. The right-hand drive-in bay 72 appears in conventional form, with drive-in angles 74 ready to receive pallets which are positioned on the drive-in angles using, e.g., a forklift. The left-hand drive-in bay 76 of drive-in rack assembly 70 has been converted to push-back configuration with a series of retrofit push-back systems 50. FIG. 11B is a left side view of drive-in rack assembly 70, showing the retrofit push-back systems 50 in place.

Two embodiments of a retrofit push-back system constructed in accordance with the present invention have been disclosed. It is nevertheless understood that further modifications, variations, and adjustments to the retrofit push-back systems of the present invention may be made by those of ordinary skill in the art without departing from the spirit and scope of the present invention. Moreover, such modifications, variations, or adjustments are considered to be within the purview of the appended claims.

I claim:

1. An apparatus for retrofitting a storage rack assembly with a push-back system comprising:
   rail structures for carrying a push-back cart;
   connecting means for attaching said rail structures to said storage rack assembly;
   means for inclining said rail structures so that the force of gravity will urge said push-back cart along said rail structures;
   structural members, each having a plurality of through holes, attached to rear sections of said rail structures; and
   forward and rearward struts attached to said structural members by fasteners passing through selected through holes.

2. An apparatus as set forth in claim 1 wherein said push-back rail structures comprise two rails formed from channel stock, thereby providing surfaces on which said push-back cart may travel.

3. An apparatus as set forth in claim 2 wherein said connecting means for attaching said push-back rail structures to said storage rack assembly includes clamping plates that are attached to said rail structures, said clamping plates being clipped over a first surface of a load beam of said storage rack assembly and said load beam being pinched between said clamping plates and another structure positioned on a second surface of said load beam, said second surface being opposed from said first surface.

4. An apparatus as set forth in claim 2 wherein said connecting means for attaching said push-back rail structures to said storage rack assembly includes a clamping mechanism comprising a U-shaped member attached to said rail structures, said clamping mechanism being clipped over a load beam of said storage rack and said U-shaped member having affixed thereon a nut through which a bolt may be threaded to pinch said load beam between said bolt and said U-shaped member.

5. The apparatus of claim 1 further comprising cross members of graduated size secured to said rail structures and supporting said rail structures in a position inclined from the horizontal.

6. An apparatus as set forth in claim 5 further comprising at least one member diagonally connecting said rail structures.

7. An apparatus as set forth in claim 1 wherein said frame structure comprises a series of channel members of graduated size connected to said rail structures such that said rail structures are slightly inclined from the horizontal.

8. An apparatus as set forth in claim 7 wherein the ends of said rail structures are connected to a structural member that is in turn connected to said storage rack assembly.

9. An apparatus as set forth in claim 7 wherein said channel members are C-shaped channel members which drop into the drive-in angles of a drive-in rack assembly.

10. An apparatus as set forth in claim 8 wherein said channel members are C-shaped channel members which drop into the drive-in angles of a drive-in rack assembly.

11. An apparatus for retrofitting a storage rack assembly with a push-back system, said apparatus comprising:
   rail structures for carrying a push-back cart, said rail structures including two rails formed from channel stock, thereby providing surfaces on which said push-back cart may travel;
   a load beam supporting said rail structures;
   connecting means for attaching said rails to said storage rack assembly, including clamping plates attached to said rails, said clamping plates clipped over a first surface of the load beam with said load beam pinched between said clamping plates and an opposing plate positioned against a second surface of said load beam, said second surface being opposed from said first surface; and
   means for inclining said rail structures so that the force of gravity will urge said push-back cart along said rails.

12. An apparatus for retrofitting a storage rack assembly with a push-back system, comprising:
a pair of rails for carrying a push-back cart, said rails formed from channel stock, and having surfaces on which said push-back cart may roll;
load beams for supporting said rails and for maintaining a predetermined distance between them;
connecting means for attaching said rails to said storage rack assembly, including a clamping mechanism comprising a U-shaped member attached to each rail, said clamping mechanism clipped over a forward load beam of said storage rack and said U-shaped member having a nut through which a bolt may be threaded to pinch said load beam between said bolt and said U-shaped member; and
means for inclining said rails so that the force of gravity will urge said push-back cart along.

* * * * *